(No Model.)
D. S. TROY.
VEHICLE PROPELLED BY COMPRESSED AIR.
No. 300,290. Patented June 10, 1884.
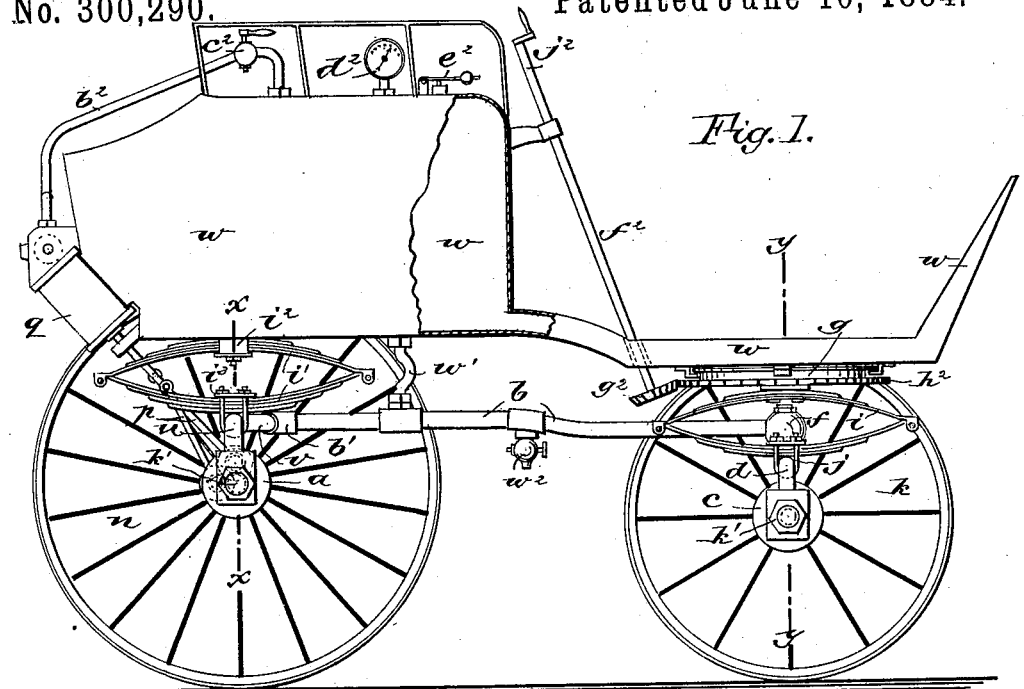
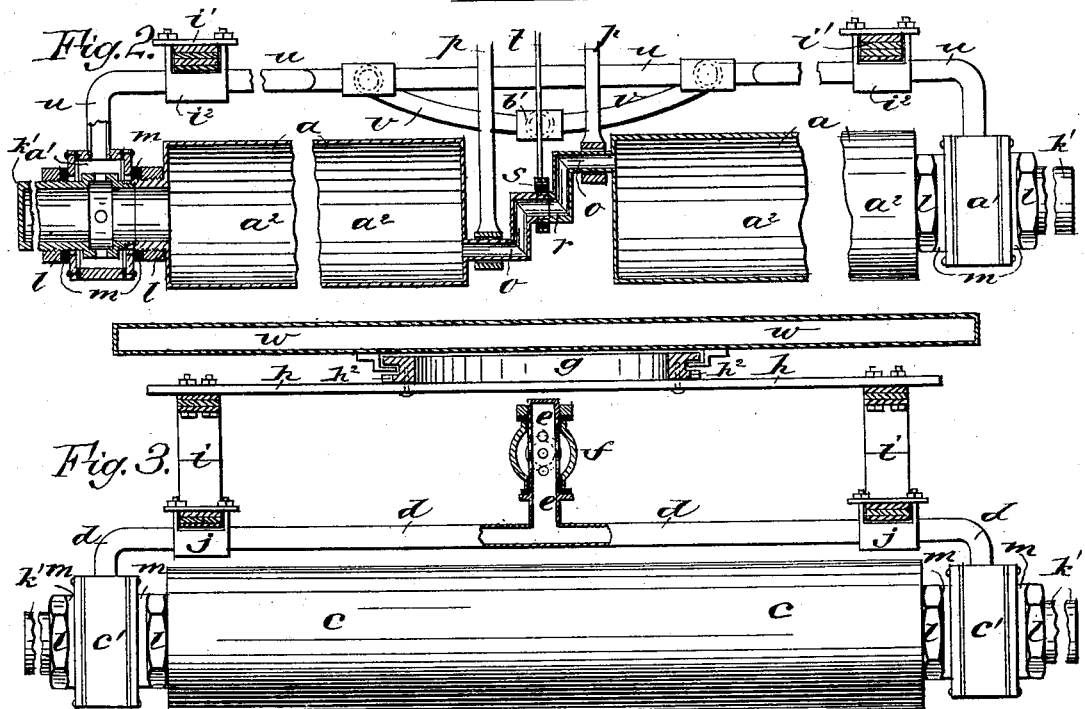
WITNESSES:
INVENTOR:
D. S. Troy
BY Munn & Co.
ATTORNEYS.

UNITED STATES PATENT OFFICE.

DANIEL S. TROY, OF MONTGOMERY, ALABAMA.

VEHICLE PROPELLED BY COMPRESSED AIR.

SPECIFICATION forming part of Letters Patent No. 300,290, dated June 10, 1884.

Application filed March 29, 1884. (No model.)

*To all whom it may concern:*

Be it known that I, DANIEL S. TROY, of Montgomery, in the county of Montgomery and State of Alabama, have invented a new and Improved Vehicle Propelled by Compressed Air, of which the following is a full, clear, and exact description.

The object of my invention is to provide road-vehicles of improved construction arranged to be operated by compressed air carried by the vehicle.

The invention consists in a vehicle constructed with its axle or axles and reach made hollow and connected to serve as a reservoir for compressed air; also, in the arrangement of the body of the vehicle in whole or in part as an air-reservoir, and connected with the hollow portions of the running-gear, the air-reservoirs being adapted to be charged at a central or roadside station, from which the vehicle may be dispatched as a self-contained motor, all as hereinafter fully described and claimed.

Reference is to be had to the accompanying drawings, forming a part of this specification, in which similar letters of reference indicate corresponding parts in all the figures.

Figure 1 is a side elevation of a four-wheeled vehicle constructed in accordance with my invention, and partly broken away. Fig. 2 is a cross-sectional elevation through the rear axle on line $x\ x$, Fig. 1, and with parts broken away. Fig. 3 is a cross-sectional elevation on line $y\ y$, Fig. 1, with parts broken away.

The letter $a$ indicates the hind axle, $b$ the reach, and $c$ the front axle, of an improved four-wheeled vehicle. I enlarge these parts considerably in diameter, and make them hollow, to serve as reservoirs for compressed air. I connect the axles with the reach, so that all shall act a single air-reservoir. This may be done in various ways. At the front axle, $c$, I arrange chambers $c'$, which are duplicates of the chambers $a'$ of the hind axle, and shown in section at the left-hand side of Fig. 2. I connect the chambers $c'$ by a tube, $d$, from which rises a hollow tube or pintle, $e$, which is fitted by a packed joint into the head or bulb $f$, connecting the tube $d$ with the reach $b$, and in a manner to permit the forward wheels to swing freely on the fifth-wheel $g$, which is held on a bar, $h$, attached to the forward springs, $i$, which connect at their lower halves or members by the clips $j$ with the tube $d$. The tube $e$ is apertured for free communication with the head $f$, in which the hollow reach $b$ is fitted, and the chambers $c'$ communicate with the tube $d$ and the interior of the hollow axle $c$, and as the tube $e$ stands at the center of the fifth-wheel $g$ it is in the axis of motion of the forward wheels in swinging them on the fifth-wheel from side to side in turning the vehicle, which may freely be done while maintaining communication between the interior of the reach and front axle, as will readily be understood. The forward wheels, $k$, may be fitted on the hub-bearings $k'$ either loosely, to turn on the bearings, or they may be fitted tightly thereon, and the axle may turn with the wheels, the chambers $c'$ being fitted on the axle with suitable collars, $l$, at each side fixed on the axle, and with packings $m$ between the collars and the chambers, to insure close joints to prevent escape of the compressed air thereat. This construction with the wheels fixed to their axle is preferred for the hind wheels $n$ on bearings $k'$ of axle $a$, which latter I show reduced materially in size at the center to form opposite driving-cranks, $o$, on which pitman-rods $p$ from the cross-heads of the pistons in the air-engine cylinder or cylinders $q$ are fitted to drive the hind axle and wheels either way in moving the vehicle.

An axial tube, $r$, connecting the hollow cranks $o$, has mounted on it the eccentric $s$, strapped loosely to the stem $t$, which works the air-valves of the engine-cylinders. The tube $r$ and cranks $o$ communicate with each other and with the two sections $a^3$ of the axle $a$, which sections, through the chambers $a'$ on the axle and the pipes or tubes $u\ v$, communicate freely with the reach, so that both the front and rear axles and the reach form a common reservoir for the compressed air to drive the vehicle. The cross tube or pipe $u$ connects the chambers $a'$, and the tube $v$ branches from it at either side to the reach, which it joins at $b'$, thus making a connection of the reach with the tube $u$ and axle $a$, which strongly braces the hind parts of the running-gear against the side-thrusts of the vehicle while in use. The hind springs, $i'$, are clipped to the body $w$ of the vehicle at $i^2$, and to the tube $u$ at $i^2$. I make the body $w$ of the vehicle hollow and air-tight, to serve also as an air-reservoir, and connect it to the reach or to either of the cross-tubes $d$ $u$ by a flexible connection, $w'$, which will permit a free vertical movement of the body on the springs, to accommodate varying loads carried and the condition of the roads traveled over. The body $w$ of the vehicle thus serves, with the hollow axles and reach, as a reservoir for the compressed air, which may be forced in through a valve, $w^2$, connecting with the reach $b$, or at any part of the air-reservoir. The compressed air passes to the engine-cylinder valves through a pipe, $b'$, leading from a point of the reservoir, allowing a valve, $c^2$, to be placed within easy reach of the rider, for starting and stopping the vehicle, and a pressure-gage, $d^2$, and safety-valve $e^2$ may be fitted to the air-reservoir at any suitable locations.

To steer the vehicle I provide a shaft, $f^2$, having a pinion, $g^2$, gearing with a toothed wheel, $h^2$, fixed to the fifth-wheel $g$, said shaft having a suitable handle device, $j^2$, for turning it either way to swing the forward wheels and axle, as may be desired.

I do not limit myself to the precise construction and arrangement of the parts of a vehicle as herein shown and described, as—for instance, the body $w$ may have its floor portion only made hollow, to serve as an air-reservoir; or a continuous zigzag pipe or tube may range back and forth within the body, to serve as an air-reservoir, and connect with the reach and axles, substantially as above described.

My improvement may also be applied to vehicles of various constructions—as, for instance, to two-wheeled vehicles with a suitable steering-wheel—and also to vehicles of varying size for different requirements, all of which vehicles may be charged with the compressed air at a roadside station, and may be run long distances with greater swiftness and economy than can be attained by travel with draft-animals.

Having thus described my invention, I claim as new and desire to secure by Letters Patent—

1. A vehicle constructed, substantially as herein shown and described, with its axle or axles and reach made hollow and communicating to serve as a reservoir for compressed air to be utilized in driving the vehicle, substantially as herein specified.

2. A vehicle constructed with its axle or axles and reach and its body portion in whole or in part made hollow and communicating to serve as a reservoir for compressed air to be utilized in driving the vehicle, substantially as shown and described.

3. A vehicle constructed with its axle or axles and reach made hollow and communicating with each other to form a reservoir for compressed air, in combination with a compressed-air engine secured thereto and constructed to revolve one of said axles, substantially as set forth.

4. A vehicle constructed with its body, axle or axles, and reach made hollow and communicating to form a reservoir for compressed air, in combination with a compressed-air engine secured to the body and constructed to revolve one of the axles, substantially as set forth.

5. The combination of the hollow reach $b$ with the hollow axles $a$ $c$ and cross-tubes $d$ $u$, connecting the hollow axles with the reach and connected to the axles by the chambers $a'$ $d'$, whereby a continuous reservoir is formed, substantially as set forth.

6. The combination of the hollow body $w$ with the hollow reach $d$ and hollow axles $c$ $a$, with the flexible pipe $w'$ connecting the hollow body with the hollow reach, whereby a continuous hollow space is formed within the body, reach, and axles, to serve as a reservoir, substantially as set forth.

7. The combination of the continuous hollow communicating body, axles, and reach, the rear axle being hollow, cranked, as at $o$ $r$ $b$, with an air-engine, $q$, communicating with the body $w$, the pitman-rods $p$, connected to the pistons of the engine and to the cranks $o$ $o$, and the stem $t$, connected to the air-valves of the engine and to the eccentrics $s$ on the middle tube, $r$, substantially as set forth.

8. The combination, with the hollow axle $a$, perforated, as shown, near its ends, with the hollow reach, connecting cross-pipe $u$, connected to and communicating with the axle by the chambers $a'$, fitting around the ends of the axle over the perforations, and held in place by the screw-collars $l$, and packing $m$ between said collars and chambers, substantially as set forth.

9. The connection between the hollow front axle, cross-pipe $d$, and the hollow communicating reach, which consists in the hollow perforated tube $e$ on the cross-pipe $d$, and bulb $f$ surrounding said perforated tube and connected to and communicating with the reach $b$.

DANIEL S. TROY

Witnesses:
HENRY C. TOMPKINS,
ALEX. TROY.